United States Patent
Nakayama et al.

(10) Patent No.: US 9,397,417 B2
(45) Date of Patent: Jul. 19, 2016

(54) WIRING MODULE HAVING A VOLTAGE DETECTION TERMINAL

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Osamu Nakayama, Mie (JP); Mitsutoshi Morita, Mie (JP); Kotaro Takada, Mie (JP); Tetsuya Fujita, Mie (JP); Yoshiyuki Ishikawa, Mie (JP); Tomoaki Yasuda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/649,080

(22) PCT Filed: Nov. 19, 2013

(86) PCT No.: PCT/JP2013/081116
§ 371 (c)(1),
(2) Date: Jun. 2, 2015

(87) PCT Pub. No.: WO2015/029267
PCT Pub. Date: Mar. 5, 2015

(65) Prior Publication Data
US 2015/0318626 A1    Nov. 5, 2015

(30) Foreign Application Priority Data

Aug. 28, 2013  (JP) ................................. 2013-176644
Sep. 13, 2013  (JP) ................................. 2013-190658

(51) Int. Cl.
*H01R 4/38*    (2006.01)
*H01R 11/11*   (2006.01)
(Continued)

(52) U.S. Cl.
CPC ................. *H01R 11/11* (2013.01); *H01G 2/04* (2013.01); *H01G 4/38* (2013.01); *H01M 2/206* (2013.01); *H01M 10/482* (2013.01); *H01M 2220/20* (2013.01)

(58) Field of Classification Search
CPC .... H01R 11/283; H01R 11/281; H01R 11/11; H01M 2/206; Y02E 60/12
USPC ................... 439/765, 627, 500, 754; 429/121
See application file for complete search history.

(56) References Cited

U.S. PATENT DOCUMENTS 8,563,161 B2 * 10/2013 Ogasawara ......... H01M 2/1072
429/121
8,999,552 B2 *  4/2015 Ogasawara ............ H01R 9/226
429/121

(Continued)

FOREIGN PATENT DOCUMENTS

JP    2012-189898 A    10/2012
JP    2013-016381 A     1/2013

(Continued)

OTHER PUBLICATIONS

Jan. 14, 2014 International Search Report issued in International Application No. PCT/JP2013/081116.

(Continued)

*Primary Examiner* — Hae Moon Hyeon
(74) *Attorney, Agent, or Firm* — Oliff PLC

(57) ABSTRACT

A wiring module that includes a connecting member for connecting adjacent electrode terminals of a plurality of electricity storage elements that have a positive electrode terminal and a negative electrode terminal; an insulating protector that has a partition wall surrounding the connecting member and that accommodates the connecting member; and a detection terminal that is connected to an end portion of an electric wire and that is laid over the connecting member.

4 Claims, 5 Drawing Sheets

(51) Int. Cl.
*H01M 2/20* (2006.01)
*H01G 4/38* (2006.01)
*H01G 2/04* (2006.01)
*H01M 10/48* (2006.01)

(56) References Cited

U.S. PATENT DOCUMENTS

| | | | | |
|---|---|---|---|---|
| 9,209,550 B2* | 12/2015 | Kinoshita | ............ | H01M 2/206 |
| 2011/0064986 A1* | 3/2011 | Ogasawara | ............ | H01M 2/206 |
| | | | | 429/121 |
| 2012/0164509 A1* | 6/2012 | Ogasawara | ............ | H01R 9/226 |
| | | | | 429/121 |
| 2014/0045388 A1 | 2/2014 | Nakayama | | |
| 2014/0287622 A1 | 9/2014 | Kinoshita et al. | | |
| 2015/0086819 A1 | 3/2015 | Ogasawara et al. | | |

FOREIGN PATENT DOCUMENTS

| | | |
|---|---|---|
| JP | 2013-016382 A | 1/2013 |
| JP | 2013-037987 A | 2/2013 |
| JP | 2013-062220 A | 4/2013 |
| JP | 2013-105571 A | 5/2013 |
| JP | 2013-120675 A | 6/2013 |
| JP | 2013-161749 A | 8/2013 |
| JP | 2013-162569 A | 8/2013 |
| JP | 2013-164904 A | 8/2013 |
| JP | 2014-049235 A | 3/2014 |
| JP | 2015-056351 A | 3/2015 |
| WO | 2011/043261 A1 | 4/2011 |
| WO | 2012/127962 A1 | 9/2012 |
| WO | 2013/061870 A1 | 5/2013 |
| WO | 2013/069525 A1 | 5/2013 |
| WO | 2013/111526 A1 | 8/2013 |

OTHER PUBLICATIONS

Aug. 17, 2015 Search Report issued European Application No. 13892421.2.

Feb. 17, 2016 Search Report issued in European Patent Application No. 13892421.2.

\* cited by examiner

WIRING MODULE HAVING A VOLTAGE DETECTION TERMINAL

This is a national phase application of PCT/JP2013/081116 filed on Nov. 19, 2013. This application claims priority to Japanese Application Number JP2013-176644, which was filed in the Japanese Patent Office on Aug. 28, 2013, and Japanese Application Number JP2013-190658, which was filed in the Japanese Patent Office on Sep. 13, 2013. The entire contents of which are incorporated by reference herein.

BACKGROUND

The present disclosure relates to a wiring module.

A plurality of electricity storage elements having positive and negative electrode terminals are lined up in a row in electricity storage modules for electric cars and hybrid cars, and are connected in series or in parallel by connecting the electrode terminals of adjacent electricity storage elements with connecting members made of metal (see JP 2013-16382A).

Here, voltage detection terminals for detecting the voltage of the electricity storage element are generally laid over the connecting members, and electric wires connected to the voltage detection terminals are guided to a battery electronic control unit (ECU).

In a battery wiring module described in JP 2013-16382A, the connecting members connecting the electrode terminals are accommodated in an accommodating member made of a synthetic resin, and the connecting members are surrounded by partitioning walls that the accommodating member is provided with. The voltage detection terminals crimped to the end portions of the electric wires are laid over the connecting members, and a direction in which each electric wire extends from the crimping portions is inclined with respect to the direction in which the connecting member is connected. Moreover, the corner portions of the voltage detection terminal are inserted into through holes that penetrate the partitioning walls in a slit shape, and thus the positions of the corner portions are fixed.

SUMMARY

In JP 2013-16382A, the through holes into which the corner portions of the voltage detection terminal are inserted penetrate the partitioning walls, and auxiliary walls for covering the corner portions of the voltage detection terminal are provided outside the partitioning walls in order to prevent a decrease in insulating properties caused by the through holes penetrating the partitioning walls. However, providing the auxiliary walls outside the partitioning walls makes the configuration of the partitioning wall complicated, thus causing a problem in that the cost of manufacturing a metal mold increases.

On the other hand, if the through holes into which the corner portions of the voltage detection terminal are inserted are not provided, a decrease in insulating properties can be suppressed, but the through holes cannot be used to fix the corner portions of the voltage detection terminal, thus causing a problem in that the voltage detection terminal is not positioned.

The present disclosure was made based on the foregoing circumstances, and it is an object thereof to provide a wiring module that can position a detection terminal while suppressing a decrease in insulating properties using a simple configuration.

A wiring module of the present disclosure includes a connecting member for connecting adjacent electrode terminals of a plurality of electricity storage elements that have a positive electrode terminal and a negative electrode terminal, an insulating protector that has a partition wall surrounding the connecting member and that accommodates the connecting member, and a detection terminal that is connected to an end portion of an electric wire and that is laid over the connecting member, wherein the detection terminal includes a fastened portion that is laid over the connecting member and that is fastened by a fastening member, and a terminal guide-out portion that is guided to an area not overlapping the connecting member, and the insulating protector includes a positioning portion into which the terminal guide-out portion is fitted and with which the terminal guide-out portion is positioned.

With this aspect, the terminal guide-out portion of the detection terminal is fitted into the positioning portion of the insulating protector and positioned, thus making it possible to position the detection terminal as a whole via the terminal guide-out portion. This positioning using the positioning portion can be achieved without fixing the corner portions of the detection terminal by inserting the corner portions into the through holes penetrating the partition walls, for example, thus making it possible to make the configuration simple and suppress a decrease in insulating properties caused by the through holes being formed in the partition walls. Therefore, it is possible to position the detection terminal while suppressing a decrease in insulating properties using a simple configuration.

It is preferable that the present disclosure has the following aspects in addition to the above-described aspect.

The terminal guide-out portion includes an electric wire connecting portion that is connected to the end portion of the electric wire, and the positioning portion is formed between the fastened portion and the electric wire connecting portion.

This makes it possible to prevent the force to fasten the fastened portion from being applied to the electric wire connecting portion.

The positioning portion includes a locking portion that is locked to the detection terminal to prevent a dislodgment of the detection terminal.

This makes it possible to reliably prevent the dislodgment of the detection terminal.

An engaged portion that includes a recessed portion or a projecting portion is provided in a lateral edge portion of the terminal guide-out portion, and an engaging portion that includes a projection or a groove portion to engage the engaged portion extends in a direction in which the detection terminal is fitted, at a position corresponding to the engaged portion in the positioning portion.

This makes it possible to easily fit the detection terminal into the positioning portion and to reliably position the detection terminal by engaging the engaging portion with the engaged portion.

The terminal guide-out portion has a plate shape and has a reinforcing projection extending in a direction in which the electric wire is connected.

This makes it possible to increase the strength of the terminal guide-out portion using a simple configuration. In addition, an increase in the strength of the terminal guide-out portion makes it possible to reliably position the terminal guide-out portion when fitting the terminal guide-out portion into the positioning portion.

The insulating protector has a connecting member holding portion for holding the connecting member, and the positioning portion is provided so as to be continuous with the connecting member holding portion in a direction in which the connecting member is connected.

Thus, in the case where a plurality of connecting members are arranged in parallel, it is possible to make the pitches between the connecting members arranged in parallel narrower compared with a configuration in which the detection terminal is positioned that is guided in a direction intersecting the direction in which the connecting members are connected. Therefore, it becomes easy to reduce the size of the wiring module.

With the present disclosure, it is possible to position a detection terminal while suppressing a decrease in insulating properties using a simple configuration.

DETAILED DESCRIPTION OF THE EMBODIMENTS

Embodiment

An embodiment will be described with reference to FIGS. 1 to 5.

Figure 1:
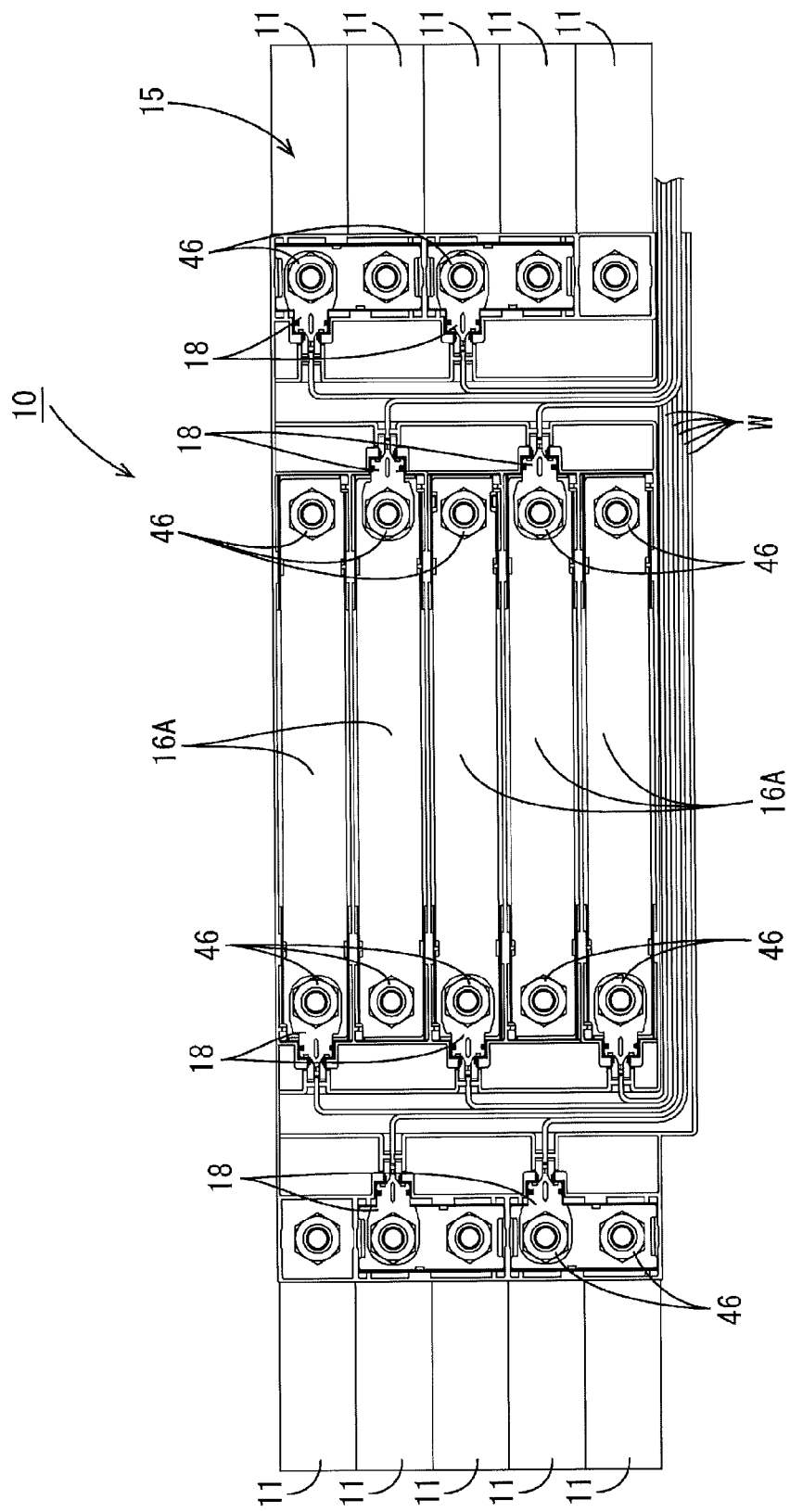
FIG. 1 is a plan view of a battery module of an embodiment.

A wiring module 15 of this embodiment is attached to a plurality of electricity storage elements 11, included in an electricity storage module 10. The electricity storage module 10 is used as, for example, a driving source for a vehicle such as an electric car or a hybrid car. In the following description, in terms of the front-rear direction, the lower side of FIG. 1 is referred to as "front side" and the upper side thereof is referred to as "rear side". The left-right direction is based on FIG. 1. The vertical direction is based on FIG. 5.

Electricity Storage Module 10

As shown in FIG. 1, the electricity storage module 10 includes the plurality of (ten in this embodiment) electricity storage elements 11 and the wiring module 15 attached to the plurality of electricity storage elements 11.

Figure 2:
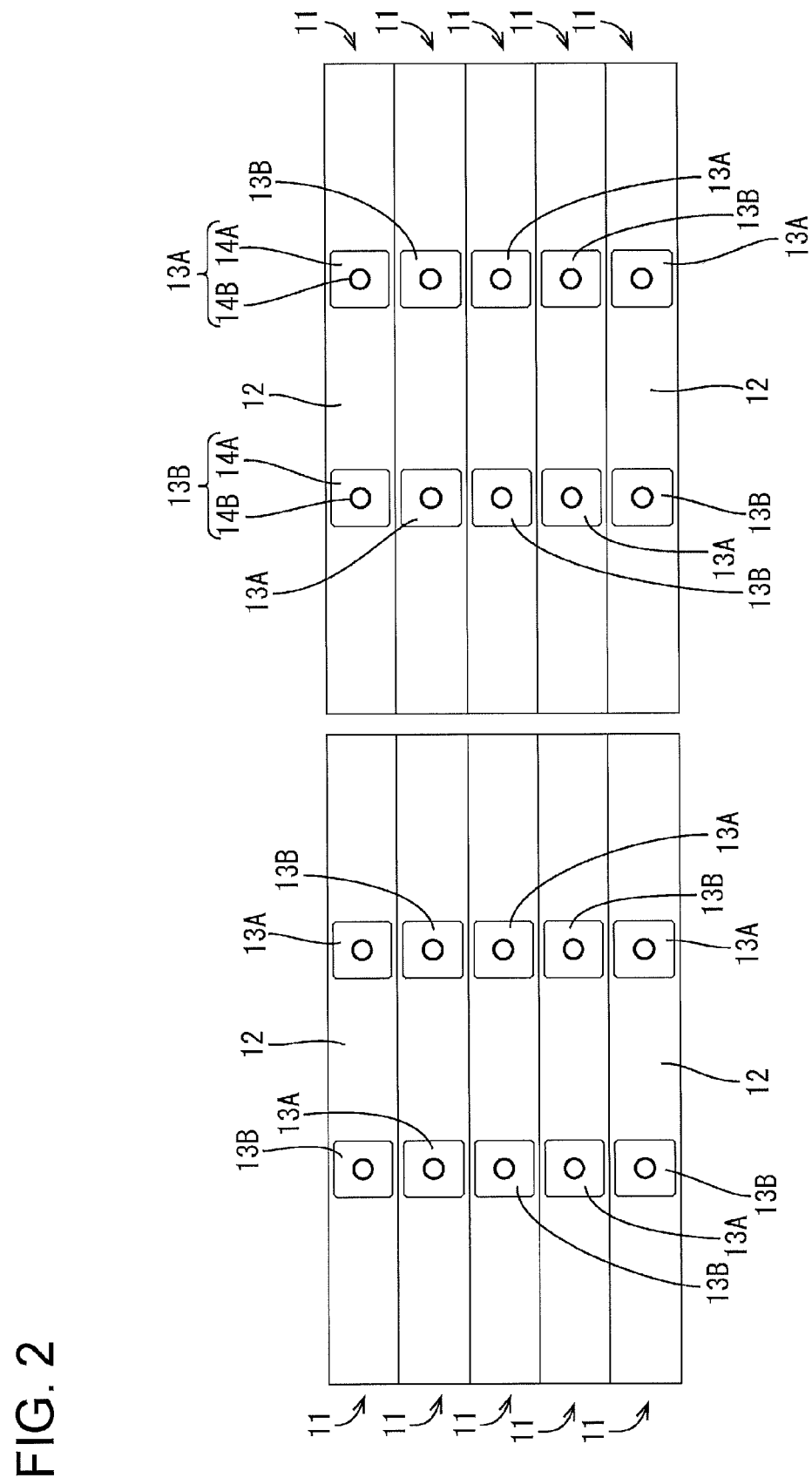
FIG. 2 is a plan view of a plurality of electricity storage elements that are lined up.

As shown in FIG. 2, the plurality of electricity storage elements 11 are configured so as to be arranged in five rows in the front-rear direction (short-length direction of the upper surface of the electricity storage element 11) and two columns in the left-right direction (longitudinal direction of the upper surface of the electricity storage element 11). In each electricity storage element 11, a pair of left and right electrode terminals 13A and 13B (a positive electrode is shown as the electrode terminal 13A and a negative electrode is shown as the electrode terminal 13B) project at a right angle from the upper surface of a flattened rectangular parallelepiped main body portion 12 accommodating an electricity storage constituent (not shown). The respective electricity storage elements 11 are arranged so as to extend in directions in which the polarities of the adjacent electrode terminals 13A and 13B are opposite to each other.

In each of the electrode terminals 13A and 13B, a bolt 14B in which a thread groove is formed in the outer circumference projects upward from a base portion 14A that projects from the main body portion 12. The bolt 14B is passed through the connecting members 16A or 16B placed on the base portion 14A, and a nut 46 serving as a fastening member is screwed on the bolt 14B and fastened thereto. Thus, the electrode terminals 13A and 13B of adjacent electricity storage elements 11 are electrically connected with connecting members 16A and 16B.

Wiring Module 15

Figure 3:
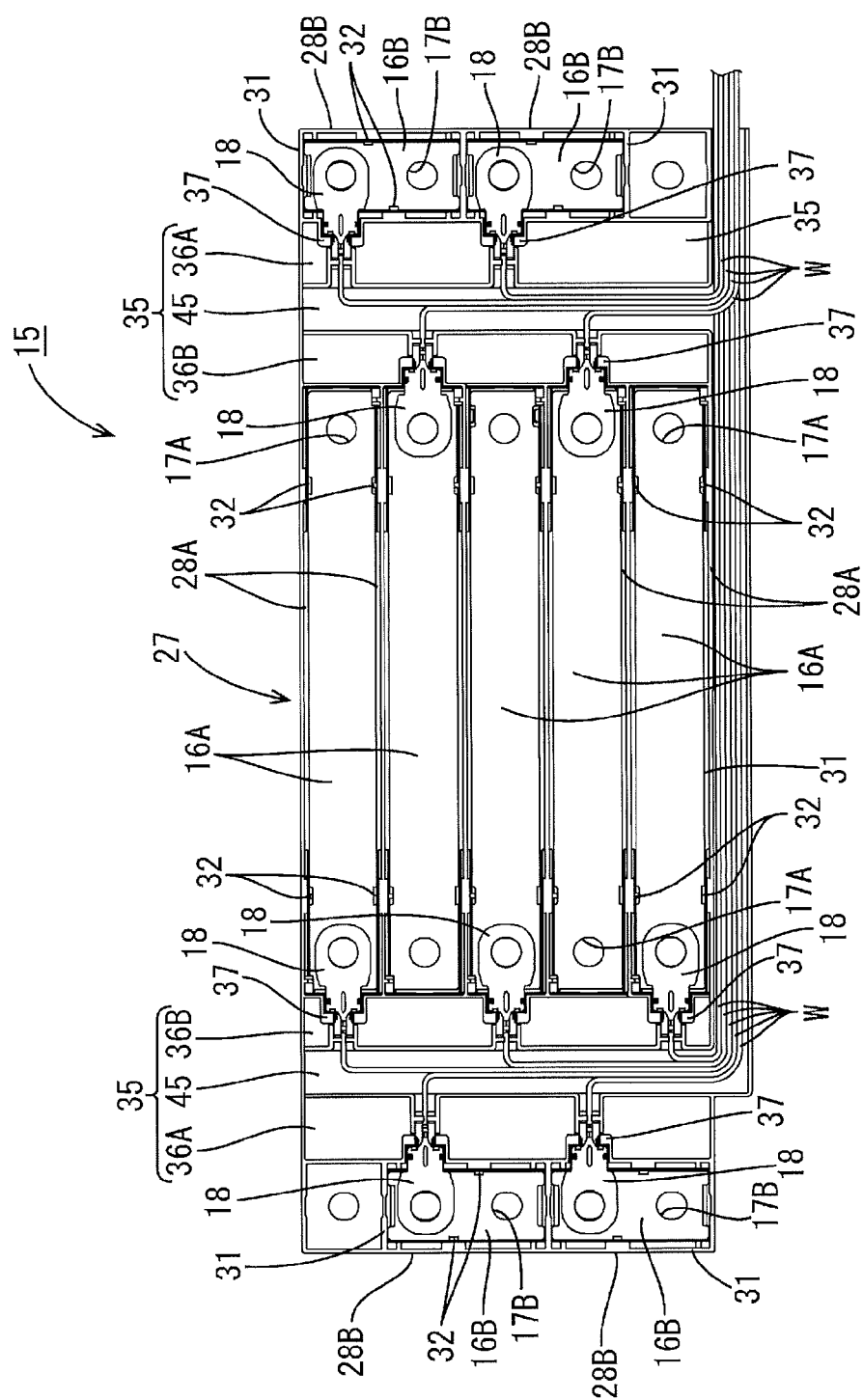
FIG. 3 is a plan view of a wiring module.

As shown in FIG. 3, the wiring module 15 includes a plurality of (nine in this embodiment) connecting members 16A and 16B that connect the electrode terminals 13A and 13B of the adjacent electricity storage elements 11, voltage detection terminals 18 (an example of "detection terminal") that are laid over the connecting members 16A and 16B, and an insulating protector 27 made of a synthetic resin that accommodates the plurality of connecting members 16A and 16B and the voltage detection terminals 18.

Connecting Members 16A and 16B

The plurality of connecting members 16A and 16B includes a plurality of longer connecting members 16A that connect the electrode terminals 13A and 13B of the different electricity storage elements 11 adjacent in the left-right direction, and shorter connecting members 16B that connect the electrode terminals 13A and 13B of the different electricity storage elements 11 adjacent in the front-rear direction and that are shorter than the longer connecting members 16A in the connecting direction.

The connecting members 16A and 16B are each made of metal such as copper, copper alloy, stainless steel (SUS), or aluminum, and are formed in a plate shape having a length corresponding to a dimension between the adjacent electrode terminals 13A and 13B. A pair of through holes 17A and a pair of through holes 17B through which the bolts 14B are inserted are respectively formed through the connecting members 16A and 16B. The through holes 17A of the longer connecting member 16A have a perfect circular shape, and the through holes 17B of the shorter connecting member 16B have an elongate circular shape that is elongate in the connecting direction.

Voltage Detection Terminal 18

Figure 4:
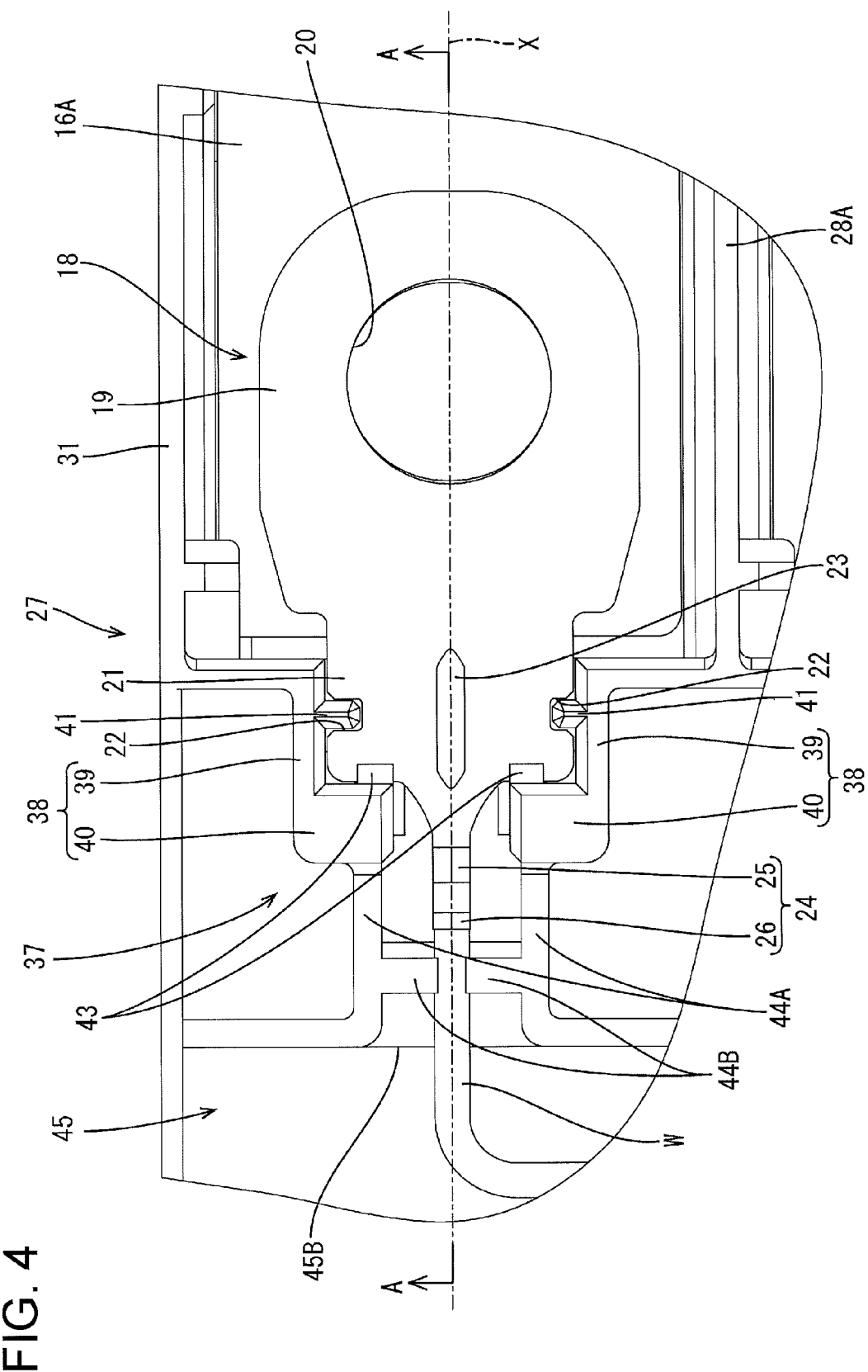
FIG. 4 is an enlarged view of a portion in which a voltage detection terminal is positioned.

The voltage detection terminals 18 are each made of metal such as copper, copper alloy, stainless steel (SUS), or aluminum, and are formed by performing stamping and bending on a thin metal plate using a pressing machine. As shown in FIG. 4, the voltage detection terminals 18 each include a fastened portion 19 that is laid over the connecting member 16A (16B) and fastened by the nut 46, and a terminal guide-out portion 21 that is continuous with the fastened portion 19, is guided to an area not overlapping the connecting members 16A and 16B, and is connected to the end portion of an electric wire W.

The fastened portion 19 has a flat plate shape. A circular through hole 20 into which the bolt 14B is inserted penetrates the center portion of the fastened portion 19, and the outer circumference of the fastened portion 19 is formed in a position corresponding to the outer circumference of the nut 46.

The terminal guide-out portion 21 is formed so as to have a substantially constant width dimension (dimension in the vertical direction in FIG. 4) that is reduced in a step manner from the end portion (left end portion in FIG. 4) of the fastened portion 19 on the electric wire W side. The terminal guide-out portion 21 has an electric wire connecting portion 24 to which the electric wire W is connected at the end portion on the electric wire W side.

In the lateral edge portions of the terminal guide-out portion 21, a pair of engaged portions 22 obtained by cutting out the lateral edge portions to form recessed portions and reducing the width dimension of the terminal guide-out portion 21 in a step manner are formed in positions having symmetry with respect to the direction of axis X (direction of the axis of the electric wire W in the position of the electric wire connecting portion 24; in the middle of the terminal guide-out portion 21). A reinforcing projection 23 extending in the direction of the axis X is formed in the middle of the terminal guide-out portion 21 in the width direction. The reinforcing projection 23 is formed by causing the terminal guide-out portion 21 to project from one surface side to the other surface side using a pressing machine or the like.

The electric wire connecting portion 24 has a wire barrel portion 25 to which a conductor portion exposed from an insulation coating of the electric wire W is crimped and an insulation barrel portion 26 that holds the electric wire W by crimping the electric wire W over the insulation coating.

The electric wire W is a coated electric wire obtained by coating a conductor portion with an insulation coating. The electric wire W is connected to a battery ECU (not shown). The battery ECU is equipped with a microcomputer, further elements, and the like, and has a well-known configuration with functions of detecting a voltage, current, temperature and the like of the electricity storage elements 11 and controlling the charge/discharge and the like of the respective electricity storage elements 11.

Insulating Protector 27

The insulating protector 27 is made of an insulating synthetic resin. As shown in FIG. 3, the insulating protector 27 includes a plurality of connecting member holding portions 28A and 28B that respectively hold the connecting members 16A and 16B, and coupling portions 35 that couple the connecting member holding portions 28A to the connecting member holding portions 28B.

The connecting member holding portions 28A and 28B include the connecting member holding portions 28A for holding the longer connecting members 16A and the connecting member holding portions 28B for holding the shorter connecting members 16B, and each have a bottom plate 29 (see FIG. 5) having a planar shape on which the connecting member 16A or 16B is placed, and partition walls 31 that are provided upright on the bottom plate 29 so as to extend along the peripheral edge of the connecting member 16A or 16B and that separate the connecting member 16A or 16B from the outside in an insulating manner. A tubular portion 30 that accommodates the base portion 14A is formed on the back side of the bottom plate 29. As shown in FIG. 3, the partition walls 31 are each provided with a plurality of pressing pieces (hold-down pieces) 32 that project toward the inner side of the partition walls 31 and that prevent the connecting member 16A or 16B from dislodging upward.

The coupling portions 35 each include extending portions 36A and 36B that extend so as to be continuous with the left and right portions of the connecting member holding portions 28A and 28B, and an electric wire passing groove 45 that has a recessed shape and couples the extending portions 36A and 36B. The extending portions 36A and 36B are each provided with a plurality of positioning portions 37 into which the terminal guide-out portions 21 of the voltage detection terminals 18 are fitted and with which the terminal guide-out portions 21 are positioned.

The positioning portions 37 are each provided so as to be continuous with the connecting member holding portion 28A for holding the longer connecting member 16A or the connecting member holding portion 28B for holding the shorter connecting member 16B.

Specifically, the coupling portions 35 are provided with the positioning portions 37 that are continuous with the connecting member holding portions 28A in the direction in which the longer connecting members 16A are connected, and these positioning portions 37 are alternately provided on the left side and right side of the connecting member holding portions 28A adjacent to each other in the front-rear direction. Moreover, the coupling portions 35 are provided with the positioning portions 37 that are continuous with the connecting member holding portions 28B in a direction intersecting the direction in which the shorter connecting members 16B are connected (a direction orthogonal to the direction in which the shorter connecting members 16B are connected in this embodiment).

As shown in FIG. 4, the positioning portions 37 are each formed between the fastened portion 19 of the voltage detection terminal 18 and the electric wire connecting portion 24 (that is, the positioning portions 37 are each formed in the position that is located between the fastened portion 19 and the electric wire connecting portion 24 in the direction of the axis X and where the terminal guide-out portion 21 of the voltage detection terminal 18 is received so as not to come into contact with the electric wire connecting portion 24), and each include a pair of L-shaped fitting portions 38 (which is an example of an engagement portion) that are fitted to the corner portions of the terminal guide-out portion 21, a pair of engaging portions 41 that each include a projection projecting inward from the inner wall of the fitting portion 38, and a pair of locking portions 43 that are locked to the voltage detection terminal 18 and prevent the dislodgment of the voltage detection terminal 18.

Each of the pair of fitting portions 38 has a thin portion 39 that extends in a direction along the lateral edge of the terminal guide-out portion 21 and a thick portion 40 that extends in a direction along the rear edge of the terminal guide-out portion 21 and is thicker than the thin portion 39.

Figure 5:
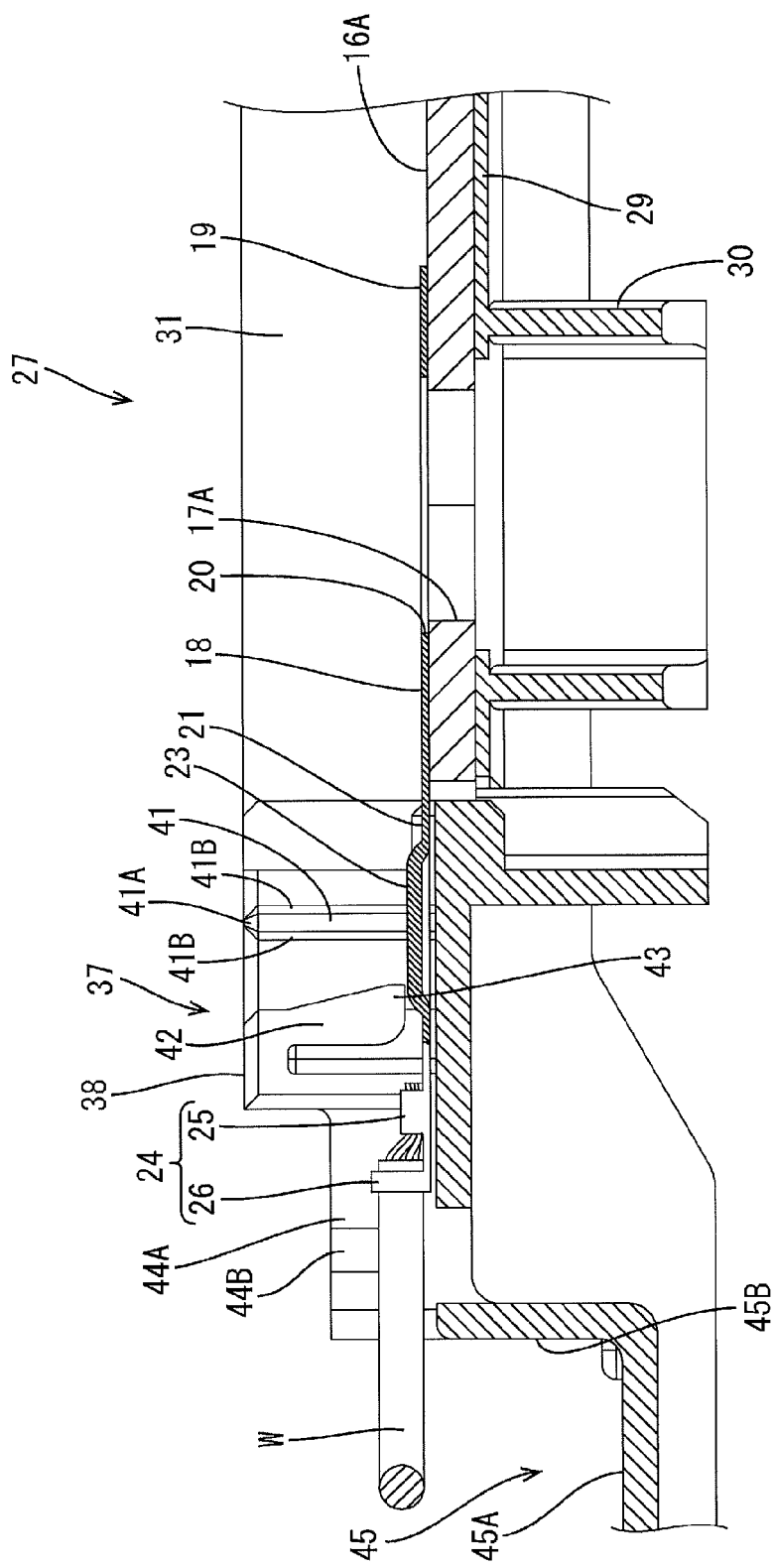
FIG. 5 is a cross-sectional view taken along line A-A in FIG. 4.

As shown in FIG. 5, the engaging portions 41 are each formed so as to extend from the upper end portion to the lower end portion of the inner wall of the thin portion 39. The upper end portion of the engaging portion 41 is formed as a tapered portion 41A in which the upper end is formed in a tapered shape, and the tapered portion 41A makes it easy to fit the engaged portion 22 of the voltage detection terminal 18. The front end portion of the engaging portion 41 is formed as a tapered portion 41B in which the front end is formed in a tapered shape by cutting out the front and rear end portions into a tapered shape.

The locking portions 43 are each provided at the front end portion of the thick portion 40, and are each formed at the tip portion of a bending piece 42 that has a base end portion formed in one piece with the upper end portion of the thick portion 40 and that can be bent and deformed.

The bending piece 42 has a shape in which the thickness (dimension in left-right direction in FIG. 5) increases toward the tip side, and is formed such that the lower end is located slightly above the terminal guide-out portion 21. The electric wire connecting portion 24 is passed between the pair of fitting portions 38. A guide portion 44A for guiding the electric wire W to the electric wire passing groove 45 is formed between the fitting portions 38 and the electric wire passing groove 45.

The guide portion 44A includes a pair of opposing walls, and the electric wire W is passed between the pair of opposing walls. The end portion of each opposing wall on the electric wire passing groove 45 side is continuous with a groove wall 45B of the electric wire passing groove 45. A pair of electric wire holding pieces 44B for holding the electric wire W inside the guide portion 44A project inward from the upper portion of the guide portion 44A.

It should be noted that FIGS. 4 and 5 show the positioning portion 37 provided on one side of the longer connecting member 16A in the left-right direction, but the positioning portions 37 provided on the left side and right side on the shorter connecting member 16B sides have the same configuration, and therefore, descriptions thereof are omitted. Here, since the positioning portion 37 on the shorter connecting member 16B side is continuous in a direction orthogonal to the direction in which the shorter connecting members 16B are connected, a space in which the positioning portion 37 and the voltage detection terminal 18 are disposed is required in the direction orthogonal to the direction in which the shorter connecting members 16B are connected. However, the positioning portion 37 on the longer connecting member 16A side requires less space in which the positioning portion 37 and the voltage detection terminal 18 are disposed in the direction orthogonal to the direction in which the longer connecting members 16A are connected.

The voltage detection terminals 18 are attached to the insulating protector 27 as follows. The voltage detection terminals 18 are fitted into the positioning portions 37, inserting the engaging portion 41 into the engaged portion 22 of the terminal guide-out portion 21, and thus the bending piece 42 abuts against the rear end portion of the terminal guide-out portion 21 and is bent and deformed. When the voltage detection terminal 18 reaches the lower end portion of the positioning portion 37, the bending piece 42 is deformed and springs back, and thus the dislodgment of the voltage detection terminal 18 is prevented. Thus, the fastened portions 19 of the voltage detection terminals 18 are laid over the connecting members 16A and 16B, and the terminal guide-out portions 21 are fitted into the positioning portions 37 and are positioned.

The electric wire passing grooves 45 each extend linearly in the front-rear direction, and have a groove bottom 45A and a pair of groove walls 45B rising upright from the groove bottom 45A. The electric wire passing groove 45 is also provided in the front end portion of the insulating protector 27 (see FIG. 3), and extends in the direction in which the longer connecting members 16A are connected. The electric wires W connected to the end portions of the voltage detection terminals 18 are each arranged so as to pass on the groove bottom 45A of the electric wire passing groove 45, and are guided to an external battery ECU or the like.

This embodiment has the following operation and effect.

With this embodiment, the terminal guide-out portion 21 of the voltage detection terminal 18 (detection terminals) is fitted into the positioning portion 37 of the insulating protector 27 and is positioned, and therefore, it is possible to position the voltage detection terminal 18 as a whole via the terminal guide-out portion 21 unlike a configuration in which the voltage detection terminal 18 is abutted such that displacement of the voltage detection terminal 18 is kept within a predetermined range when the voltage detection terminal 18 is displaced, for example. This positioning using the positioning portion 37 can be achieved without fixing the corner portions of the voltage detection terminal 18 by inserting the corner portions into through holes penetrating the partition walls 31, for example, thus making it possible to make the configuration simple and suppress a decrease in insulating properties caused by the through holes being formed in the partition walls 31. Therefore, it is possible to position the voltage detection terminal 18 while suppressing a decrease in insulating properties using a simple configuration.

Moreover, the terminal guide-out portion 21 includes the electric wire connecting portion 24 that is connected to the end portion of the electric wire W, and the positioning portion 37 is formed between the fastened portion 19 and the electric wire connecting portion 24.

This makes it possible to prevent the force to fasten the fastened portion 19 from being applied to the electric wire connecting portion 24.

Furthermore, the positioning portion 37 includes the locking portion 43 that is locked to the voltage detection terminal 18 to prevent the dislodgment of the voltage detection terminal 18.

This makes it possible to reliably prevent the dislodgment of the voltage detection terminal 18.

Moreover, the engaged portion 22 that includes a recessed portion is provided in the lateral edge portion of the terminal guide-out portion 21, and the engaging portion 41 that includes a projection to engage the engaged portion 22 extends in a direction in which the voltage detection terminal 18 is fitted, at the position corresponding to the engaged portion 22 in the positioning portion 37.

This makes it possible to easily fit the voltage detection terminal 18 into the positioning portion 37 and to reliably position the voltage detection terminal 18 by engaging the engaging portion 41 with the engaged portion 22.

Furthermore, the terminal guide-out portion 21 has a plate shape and has the reinforcing projection 23 extending in a direction in which the electric wire W is connected.

This makes it possible to increase the strength of the terminal guide-out portion 21 using a simple configuration. In addition, an increase in the strength of the terminal guide-out portion 21 makes it possible to reliably position the terminal guide-out portion 21 when fitting the terminal guide-out portion 21 into the positioning portion 37.

Furthermore, the insulating protector 27 has the connecting member holding portion 28A for holding the longer connecting member 16A, and the positioning portion 37 is provided so as to be continuous with the connecting member holding portion 28A in a direction in which the longer connecting member 16A is connected.

Thus, in the case where a plurality of longer connecting members 16A are arranged in parallel, it is possible to make the pitches between the longer connecting members 16A arranged in parallel narrower compared with a configuration in which the voltage detection terminal 18 is positioned that is guided in a direction intersecting the direction in which the longer connecting members 16A are connected. Therefore, it becomes easy to reduce the size of the wiring module.

Other embodiments

The present disclosure is not limited to the embodiment explained by the above description and the drawings. Other embodiments, which will be explained below, for example, are also included in the technical scope of the present disclosure.

(1) Although the above-described embodiment has a configuration in which the engaged portion 22 of the voltage detection terminal 18 is formed as a recessed portion and is engaged with the engaging portion 41, which is a projection provided in the positioning portion 37, there is no limitation to this. An engaged portion may be formed as a projecting portion, an engaging portion may be formed as a groove portion extending in a direction in which the voltage detection terminal 18 is fitted, and the projecting portion may be engaged with the groove portion.

(2) Although the above-described embodiment has a configuration in which the voltage detection terminal 18 for detecting the voltage of the electricity storage element 11 is positioned using the positioning portion 37, there is no limitation to this. For example, a configuration may be used in which a detection terminal for detecting a state (e.g., current) other than the voltage of the electricity storage element 11 is positioned using the positioning portion 37.

(3) Although the above-described embodiment has a configuration in which the electrode terminals 13A and 13B have a bolt shape and is fastened by a fastening member that includes the nut 46, there is no limitation to this. A configuration may be used in which an electrode terminal has a nut shape and is fastened by using a bolt, which is a separate member, as a fastening member.

(4) In the above-described embodiment, the configuration in which a plurality of electricity storage elements 11 are connected in series is described, but there is no limitation to this. A configuration may be used in which a plurality of electricity storage elements 11 are connected in parallel.

(5) Although the example in which a battery was used as the electricity storage element 11 was shown, a capacitor or the like may be used as an electricity storage element.

(6) The number of the electricity storage elements 11 is not limited to the number noted in the above-described embodiment, and can be changed as appropriate. Also, the shape of the wiring module can be changed as appropriate in accordance with the number of the electricity storage elements 11.

The invention claimed is:

1. A wiring module, comprising:
   a connecting member that connects between adjacent electrode terminals of a plurality of electricity storage elements that have a positive electrode terminal and a negative electrode terminal;
   an insulating protector that has a partition wall surrounding the connecting member and that accommodates the connecting member; and
   a detection terminal that is connected to an end portion of an electric wire and that is laid over the connecting member, wherein:
   the detection terminal is provided with (i) a fastened portion that is laid over the connecting member and is fastened by a fastening member and (ii) a terminal guide-out portion that is guided to an area that does not overlap the connecting member and whose diameter is reduced from an end portion of the fastened portion;
   the insulating protector is provided with an engaging portion that engages the terminal guide-out portion;
   the terminal guide-out portion is provided with an electric wire connecting portion that is connected to the end portion of the electric wire;
   the engaging portion is formed between the fastened portion and the electric wire connecting portion;
   part of a peripheral portion of the terminal guide-out portion is provided with an engaged portion formed of a groove portion or a projection portion; and
   at an internal wall of an engagement portion, at a position corresponding to the engaged portion, the engaging portion is constituted by a projection portion that engages the groove portion of the engaged portion or a groove portion that engages the projection portion of the engaged portion that extends along a direction in which the detection terminal is engaged.

2. The wiring module as set forth in claim 1, wherein:
   the insulating protector includes a locking portion that locks to the detection terminal and restricts detachment of the detection terminal.

3. The wiring module as set forth in claim 1, wherein:
   the terminal guide-out portion has a plate shape and has a reinforcing projection portion extending along a connecting direction of the connecting member at an intermediate portion of the terminal guide-out portion in a width direction.

4. The wiring module as set forth in claim 2, wherein:
   the terminal guide-out portion has a plate shape and has a reinforcing projection portion extending along a connecting direction of the connecting member at an intermediate portion of the terminal guide-out portion in a width direction.

* * * * *